United States Patent [19]

Wagner

[11] 4,268,467
[45] May 19, 1981

[54] PROCESS FOR MAKING FRICTION PRODUCTS

[75] Inventor: Harry H. Wagner, Ridgeway, Pa.

[73] Assignee: Carlisle Corporation, Cincinnati, Ohio

[21] Appl. No.: 84,354

[22] Filed: Oct. 12, 1979

[51] Int. Cl.³ .............................................. B29G 1/00
[52] U.S. Cl. .................................. 264/111; 264/122; 264/313
[58] Field of Search ...................... 264/111, 122, 313

[56] References Cited

U.S. PATENT DOCUMENTS

| | | | |
|---|---|---|---|
| 1,958,184 | 5/1934 | Cross | 264/313 |
| 3,158,479 | 11/1964 | Anderson et al. | 264/111 |
| 4,085,179 | 4/1978 | Hillhouse et al. | 264/122 |

*Primary Examiner*—James R. Hall
*Attorney, Agent, or Firm*—Robert A. Cesari; John F. McKenna; Andrew F. Kehoe

[57] ABSTRACT

An improved process for molding fiber-reinforced articles and in particular, those articles which are formed from monofilaments such as metal fibers and processed mineral fibers of the slag type. The fiber-containing molding composition is enclosed in a restraining means, such as a bag, and placed in a mold and formed during which time the bag advantageously deteriorates.

6 Claims, No Drawings

PROCESS FOR MAKING FRICTION PRODUCTS

BACKGROUND OF THE INVENTION

This invention relates to an improved process of making heat-resistant, friction products such as brake shoe linings and the like.

For a long time, asbestos fibers have been the dominant fiber used in making brake shoe linings and like products. The success of asbestos was largely due to its excellent heat resistance and other physical properties which it imparted to the finished products. The material had substantial additional processing advantages as became readily apparent to those investigators who attempted to find suitable substitutes for asbestos. For example, asbestos fibers can be viewed as bundles which tend to open up to form additional fibrous surface and help bind an ostensibly dry molding composition together. One important way in which this characteristic was utilized included a preforming step wherein asbestos-reinforced compositions were compressed to a shaped article having sufficient density and green strength to facilitate its subsequent handling and processing into a finished product. A number of fiber substitutes have been suggested for asbestos. These include such materials such as the slag material disclosed in U.S. Pat. No. 4,150,011 to Searfoss and Jones, the basalt rock product disclosed in U.S. Pat. No. 3,896,075; metal fibers; and the like. In general, these fibrous substituents resisted the traditional preforming techniques, or yielded pre-molds which were of an inconveniently low green strength, or required undesirable modification of the subsequent molding step.

A number of techniques were tried in an attempt to provide a suitable process for utilizing the slag fibers. These involved the necessity of using relatively slow processing procedures and/or the use of chemical additives. In either case, the resulting process was unwieldy and expensive.

SUMMARY OF THE INVENTION

It is a principal object of the invention to provide an improved process for molding a heat-resistant, fiber-reinforced, friction product.

It is a particular object of the invention to provide an improved process as described above which is clean, and economical in energy requirements.

Another object of the invention is to provide a process for molding such friction products which eliminates the need for a green-strength-imparting preforming step before a final molding step.

A further object of the invention is to provide a process comprising an encapsulation step and the automatic thermal disposal of the encapsulating means after its principal function has been performed.

Still another object of the invention is to provide a novel molded product.

Other objects of the invention will be obvious to those skilled in the art on their reading of this disclosure.

The above objects have been achieved by a process whereby a molding composition is placed within a bag, preferably a thermally decomposable bag, and placed, advantageously without a premolding step, into a mold wherein the composition is formed into an article of manufacture. The process has been found to be particularly suitable for just that class of particles, e.g. monofilament fibers, which fail to provide the desirable particle interaction previously achieved with asbestos. One reason for this suitability is that the decreased bulk characteristics of monofilament fibers enable compositions, usually characterized by a bulk density of 30 lbs per cubic foot or more, to be fed to the final mold in a more compact package than would have been possible with asbestos.

Molding pressures and temperatures are selected within the ranges known to those skilled, to provide the desired physical properties in the finished articles. However, if the encapsulating material is to be destroyed in the mold, temperatures should be selected to assure such destruction. Temperatures in excess of about 275° F. and above are suitable for the destruction of thin polyethylene encapsulating bags. Moreover, if it is decided to recycle a bag, a more thermally resistant and mechanically stronger bag material may be selected in order to contain the composition. Also the mold temperature may be kept below the temperature at which the bag will thermally destruct. In such a case, the bag should be constructed from (or coated with an effective quantity of) a material that resists sticking, e.g. a polyfluorocarbon such as polytetrafluoroethylene or one of the polyfluorocarbon-bearing copolymers known to the art. Such a bag will normally require either an adhesive seal or a heat sealable coating on the closure portion thereof to provide a suitable sealable bag.

The encapsulating polymer is advantageously very thin, e.g. from about 0.0005 to 0.003 inch in thickness. It is desirable that the amount of composition encapsulated be weighed with good accuracy, say plus-or-minus 2% but, preferably, plus-or-minus 0.5%.

The compositions useful in the process of the invention will normally use a curable thermosetting resin binder system such as the phenolic systems, e.g. phenol-aldehyde systems well known to the art.

Among the fibers which are readily used are the elongate, spun-blast furnace slag fibers of the type sold by Jim Walter Corporation, basalt fibers, and metallic fibers. Carbon fibers may also be used although they have a relatively low bulk density. (Carbon fibers are considered inorganic fibers for the purpose of this description.) Generally, cylindrical fibers which are free of nodular-shaped ends are preferable. The fibers are mixed with the other ingredients, the resulting mix is enclosed (desirably sealed) in the encapsulating web. The encapsulated composition is then transferred to apparatus known in the art as a curing mold. The encapsulating web may be provided in bag form, and the bag will be selected according to the quantity of composition to be included and according to the dimensional requirements of the particular mold to be utilized. For example, polyethylene bags of two mils in thickness and about two feet high and eight inches wide are suitable for handling about 10 pounds of molding composition in the application specifically described in Example 1. However, such materials as paper may be used when for some reason, they meet the special requirements of some manufacturer.

Specific Embodiments of the Invention

In this application there is described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

EXAMPLE 1

A composition is formed of 27% by weight of spun-blast furnace slag fibers of the type available from Jim Walter Corporation; 16% by weight of a thermosetting phenolaldehyde resin system of the type known in the brake lining art; 13% by weight of small, synthetic rubber particles of about 20 mesh and derived from tire peelings; 1% by weight of corundum, and 28% by weight of barytes filler, 5% by weight of flake graphite as a particulate lubricant, 7% by weight of a friction particle product, i.e. cashew oil/aldehyde reaction product, as known in the brake-lining manufacture and available from several suppliers and 3% of carbon black pigment.

The composition is thoroughly mixed as known in the art and 10 pounds of the resulting composition is metered into a bag (nominally about 8 inches wide and 23 inches high) formed of 0.002-inch thick polyethylene film. After the filling operation, the bag is sealed in such a position that it holds the composition loosely. A sewing procedure is entirely suitable as a sealing step, because it is the containment of the composition that one is achieving, not a hermetic sealing of the bag.

The loaded and sealed bag is placed in a mold designed to hold a slab for conversion by procedure known to the art into standard, industry-recognized Part Number FMS 4515 brake shoe lining, all by procedures as known to the art. The pressure is raised slowly to about 700 psi; then a degassing (or bumping) of the mold contents is achieved by relieving the pressure. Thereupon the molding cycle is carried out at 330° F. under a pressure of 2000 psi for about 20 minutes. At the end of this time, the product is removed from the mold.

The molded slab is then processed through finishing steps, i.e. additional curing and machining steps known in the art of making brake linings.

The resulting molded product is highly suitable for post-curing and finishing operations and yields an excellent brake lining characterized by excellent wear, and a surprisingly beneficial effect on the wear and surface finish characteristics of opposing metallic brake members.

EXAMPLE 2-3

The process of Example 1 is repeated using bags formed of another thermoplastic polymer, i.e. poly(-vinylchloride) and, also, of the heat-shrinkable film formed of the copolymer of vinyl chloride and vinylidene chloride and sold under the trademark Saran by the Dow Chemical Company. Each bag proves to be a highly suitable encapsulating vehicle and is substantially decomposed during the molding cycle.

The copolymer bag, when subjected to heat and, before being placed in the mold, shrinks to form a particularly snug preformed package; but any advantages in handling of this package in any given mold have to be balanced against somewhat superior mold-filling characteristics of those more loosely encapsulated packages which are not subjected to a heat shrinking step.

EXAMPLE 4

The process of Example 1 is repeated using a Kraft paper bag. The resultant molded material is acceptable. However, the paper residue presented some handling and maintenance problems. Moreover, use of a sealing step requires either a strip of adhesive activated before the placing of the bag in the mold or the use of a bag-closing tape.

EXAMPLE 5

The process of Example 1 is repeated using an equivalent volume of the basalt fiber composition and other ingredients well known in the art.

|  | Parts by Weight |
| --- | --- |
| Basalt fiber | 5 parts |
| Phenol/aldehyde Resin Molding Powder | 1 part |
| Chromite Dust | 1 part |
| Barytes | 2 parts |
| Brass Dust | 1 part |

After the composition is molded and the part is treated according to Example 1, a suitable brake shoe results.

EXAMPLE 5-6

The process of Example 1 is repeated substituting volumetrically equivalent quantities of steel wool fibers and, in a separate experiment, a volumetric equivalent of monofilament carbon fibers for the slag fibers. The process is operable for each type of fiber.

It is to be understood that the following claims are intended to cover all of the generic and specific features of the invention herein described and all statements of the scope of the invention which might be said to fall therebetween.

What is claimed is:

1. In a process for molding a shaped article of thermally-resistant, fiber-reinforced, friction material from a composition comprising an effective quantity of inorganic heat-resistant fiber reinforcement admixed with an effective quantity of a thermo-setting resin binder system, the improvement comprising:
    (a) enclosing a quantity of said composition to be molded to said desired shape within a thermally decomposable container of flexible encapsulating material,
    (b) sealing said container,
    (c) placing said sealed container and contents therein within a curing mold having a shape for said shaped article,
    (d) heating and pressing said composition within said mold to cure said resin binder to bond the composition into said shaped article, wherein said heating within said mold thermally decomposes said container; and
    (e) opening said mold and removing said molded article.

2. The process of claim 1 wherein said flexible encapsulating container is a thermoplastic bag.

3. The process of claim 1 wherein said bulk density of said composition, prior to step (a), is at least 30 lbs. per cubic foot.

4. The process of claims 1, 2, or 3, wherein said fiber therein is a spun-slag mineral fiber.

5. The process of claim 1 or 2 wherein said fiber is selected from the group consisting of basalt fiber, carbon fiber and steel fiber.

6. The process of claim 1 wherein said container is a polymeric film having a thickness of about 0.0005 to 0.003 inch.

* * * * *